United States Patent

Peterson

[15] 3,701,282
[45] Oct. 31, 1972

[54] COLD STORAGE TEMPERATURE MONITOR

[72] Inventor: John B. Peterson, Madison, Wis.

[73] Assignee: W. R. Grace & Co., New York, N.Y.

[22] Filed: June 1, 1970

[21] Appl. No.: 42,127

[52] U.S. Cl. ................................. 73/358, 116/114.5
[51] Int. Cl. ............................................. G01k 11/06
[58] Field of Search ........ 73/358; 116/114.5; 211/72, 211/74

[56] References Cited

UNITED STATES PATENTS

| | | | |
|---|---|---|---|
| 2,847,067 | 8/1958 | Brewer | 73/358 |
| 3,130,836 | 4/1964 | Conrad | 211/74 |
| 2,677,278 | 5/1954 | Smith et al. | 73/358 |
| 3,054,378 | 9/1962 | Bienfait | 116/114 |
| 3,177,843 | 4/1965 | Geocaris | 116/114.5 |
| 2,856,885 | 10/1958 | Hoyck et al. | 116/106 |

Primary Examiner—Richard C. Queisser
Assistant Examiner—Herbert Goldstein
Attorney—Arthur P. Savage and Kenneth E. Prince

[57] ABSTRACT

This invention comprises a reusable temperature recording telltale for cryogenic refrigerators, and in particular a telltale for use in a cryogenic refrigerator with racks for the storage of ampules, vials or other containers. The telltale device consists of an ampule, vial or other similar container which contains a liquid which has a melting-freezing point at a definite known temperature. This contained liquid within the ampule is frozen in a first orientation, and placed in the cryogenic refrigerator in a second orientation, but since frozen, it maintains its first orientation. However, if the cryogenic refrigerator achieves a temperature above the melting-freezing point of the contained liquid, it takes up the second orientation, recording the temperature excursion. Further, when a series of ampules containing liquids have varying melting-freezing points, the temperature excursion can be closely calculated, and when used in combination with a rack which maintains the orientation within the refrigerator, there is no possibility of an erroneous reading.

4 Claims, 7 Drawing Figures

PATENTED OCT 31 1972 3,701,282

John B. Peterson
INVENTOR

BY

ATTORNEY

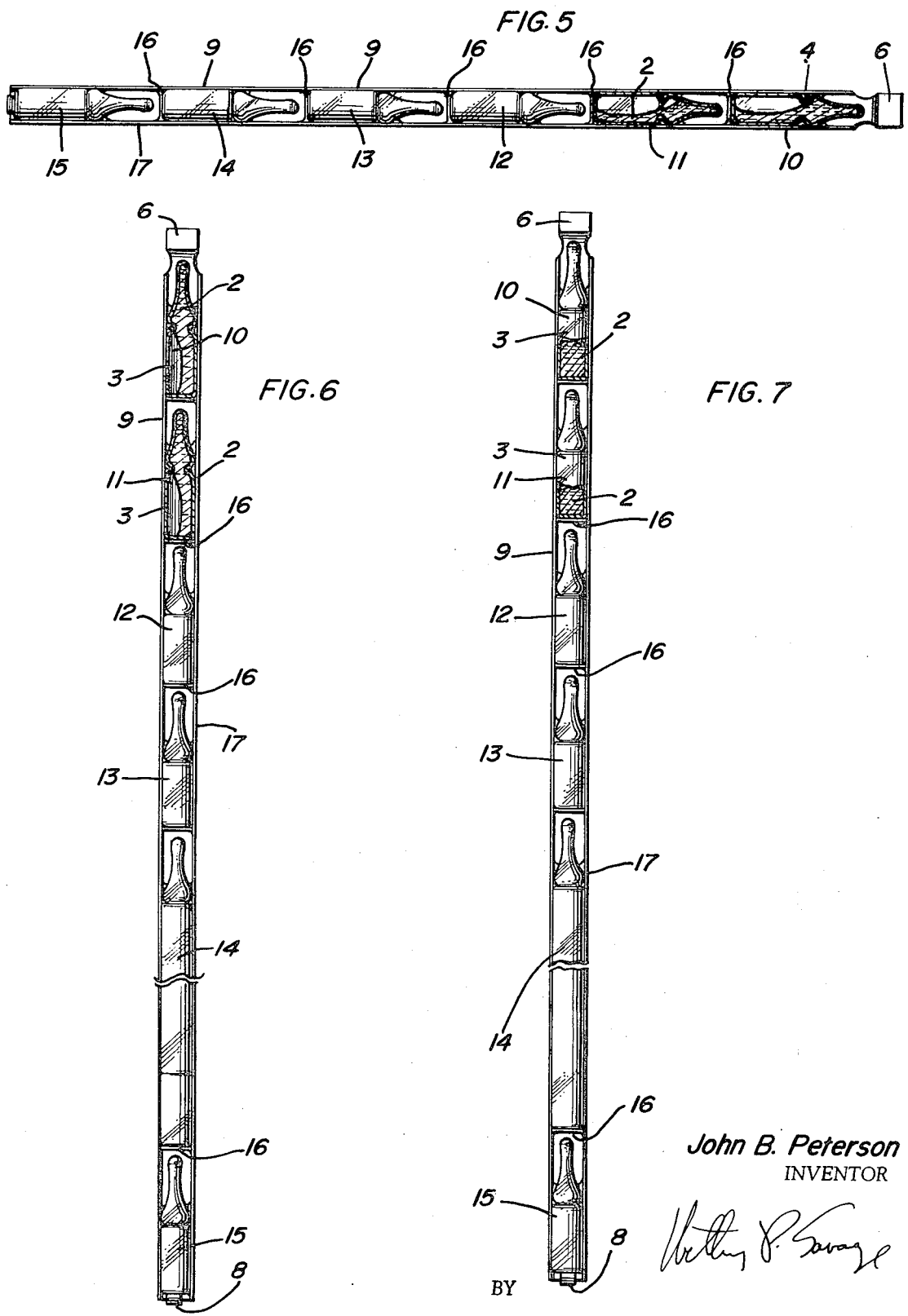

COLD STORAGE TEMPERATURE MONITOR

BACKGROUND OF THE INVENTION

This invention relates to a reusable telltale temperature recording device, and the method of using such a device to accurately detect refrigerator temperature excursions, particularly in cryogenic refrigerators. This invention further relates to a refrigerator rack for holding and dispensing a plurality of articles, particularly for use in a cryogenic refrigerator, the reusable telltale device being an integral part of the rack.

Many articles must be stored under varying degrees of refrigeration. This refrigeration, as presently commercially used, mainly ranges from 0°C down to liquid nitrogen temperatures. Refrigeration techniques that have been developed are generally inexpensive and require minimal direct human control. In transit, the refrigeration system generally need not be checked, there being a small chance of failure. For these reasons, and since in many uses temperature excursions are not fatal to the refrigerated product, elaborate systems and control devices have not been developed. However, for some refrigerated products, such as biological specimens, a temperature excursion can be fatal to its effectiveness. For such products, it is most desirable that just prior to use it is possible to readily determine whether a temperature excursion has destroyed the product.

One such circumstance is when biological specimens, such as ampules of frozen bovine semen, cultures and the like are to be transported in cryogenic storage vessels. Any temperature excursion will destroy the effectiveness of the semen, and if subsequently used will result in an ineffective insemination, and the loss of the use of a productive animal for a period of time. The present invention solves this problem in an inexpensive and effective manner. Using the device of the present invention, it can be readily predetermined just prior to use whether a bovine semen has experienced any fatal temperature excursions during any stage of its storage or transport. This is accomplished by one or more of the racks which hold the ampules of frozen semen also containing as an integral, but removable and reusable, part, telltale temperature recording devices. These devices are set to record any excursions over a critical temperature point or range.

In the cryogenic refrigerator, there may in some instances be one, two or more temperature telltale ampules per rack, or there may be a single rack containing one or more telltale ampules. These requirements are dictated by each individual shipment, whether a rack is to be transferred to another cryogenic refrigerator, number and duration of cryogenic refrigerator intermittent openings and so on. Generally, in a sealed cryogenic refrigerator the temperature is constant throughout the internal volume, with possible temperature excursions when the vessel is opened for material removal or some other purpose. For this reason, in a preferred use those racks and particularly that portion of those racks that are most exposed and vulnerable (upper) that is, which are in closest proximity of the cryogenic refrigerator opening contain the telltale temperature recording ampules, with the remaining rack solely containing the semen samples. In this way, if there was no temperature excursion experienced by the most exposed and vulnerable ampules (telltale temperature devices) there could be no possible excursion experienced by the less exposed semen sample ampules.

This invention is broadly an improvement in telltale temperature devices such as those set out in the U.S. Pat. Nos. 2,856,885 and 2,983,247, and more specifically an improvement in a cryogenic refrigerator storage rack such as that set out in U.S. Pat. No. 3,130,836. In regard to U.S. Pat. Nos. 2,856,885 and 2,983,247, the recording telltale devices of the present invention comprise a device not requiring the use of two or more fluids, or of solid particles. Further, the telltale device of the present invention is readily reusable. In the device of the present invention, all that is necessary is that an ampule, vial or similar container contain a fluid which has a melting-freezing point within a certain range; that this fluid be frozen while the ampule is in a first orientation, and inserted, using a second orientation, into the area where a temperature excursion is to be recorded. Any temperature excursion will be recorded by a reorientation of the fluid. The present invention is an improvement over the storage rack of U.S. Pat. No. 3,130,836, in that when the telltale ampules, vials or similar containers are an integral part of such a rack, the immediate area temperature environment experienced by bovine semen or like material contained in such a rack can be continuously maintained. The advantage is that this telltale temperature recording device remains in close proximity to the semen sample right up to its use. By such a method, the temperature history can be noted at a glance, saving considerable subsequent time and effort.

Accordingly, it is an object of this invention to provide an improved temperature recording telltale device.

It is further an object of this invention to provide a recording telltale temperature device which is readily reusable.

It is also an object of this invention to provide a recording telltale temperature device for cryogenic refrigerators.

It is additionally an object of this invention to provide an improved cryogenic refrigerator storage rack containing temperature recording devices.

It is another object of this invention to set out an improved cryogenic refrigerator storage method.

Further and additional objects will appear from the description, appended drawings and claims.

BRIEF SUMMARY OF THE INVENTION

This invention comprises a reusable temperature recording device consisting of a single or plurality of ampules, vials or similar containers; each containing a fluid having a definite melting-freezing point whereby when said ampules, vials or other containers are put in a first orientation, cooled to a temperature below the melting-freezing points of said fluids, and then put in a second orientation whereby any temperature excursion above the melting-freezing points is permanently recorded by a reorientation of the fluid. This invention further comprises a cryogenic refrigerator having a rack to support a plurality of biologic specimen ampules, vials or other containers; and integrated into said rack, there being one or a plurality of reusable ampules, vials or other containers are put in a first orientation, cooled to a temperature below the melting-freezing points of said fluids, and then put in a second orientation, any temperature excursion of the cryogenic refrigerator above the melting-freezing point is permanently recorded. Further, the present invention comprises a method of determining the extent of temperature excursion for a cryogenic refrigerator using a reusable temperature recording telltale device.

BRIEF DESCRIPTION OF THE DRAWINGS

FIG. 5 is a front elevation of a cryogenic refrigerator rack in a first orientation containing a plurality of telltale temperature recording ampules and a plurality of product ampules.

FIG. 6 is a front elevation of a cryogenic refrigerator rack in a second orientation, containing both telltale temperature recording ampules and product ampules.

FIG. 7 is a front elevation of a cryogenic refrigerator rack in a second orientation which has experienced a temperature excursion above the critical point of the product samples.

DETAILED DESCRIPTION OF THE INVENTION

Broadly, the present invention comprises a device and method for determining the event and degree of a temperature excursion of a refrigeration device, and in particular of a cryogenic refrigeration device. Many products and materials must be stored and transported under refrigeration, and any loss of refrigeration will ruin or seriously affect their usefulness. In particular, materials of this type are biologic specimens such as semen and cultures. When animal semen is being transported, any loss of refrigeration and subsequent rise in temperature of the refrigerator chamber will destroy its effectiveness. However, in appearance, it cannot be determined whether the animal semen has been destroyed and any subsequent use would prove futile.

The telltale temperature recording device of the present invention solves this problem by monitoring and recording any temperature excursion, and allowing by a glance a determination of such an occurrence. This is accomplished by having the telltale device as an integral part of the rack used to store the animal semen samples within the refrigerator. Using this technique, the temperature environment of the animal semen samples is constantly monitored.

Figure 1:
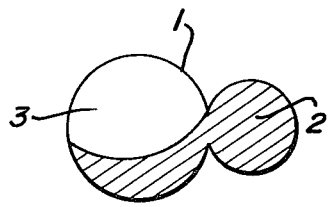
FIG. 1 is a front elevation of an ampule in a first orientation.
Figure 2:
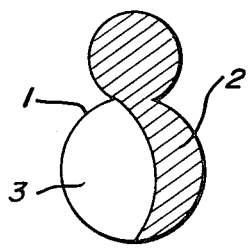
FIG. 2 is a front elevation of an ampule in a second orientation.
Figure 3:
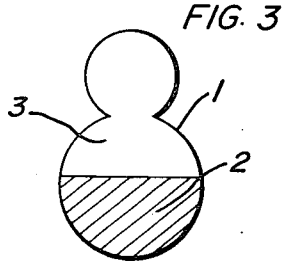
FIG. 3 is a front elevation of an ampule in a second orientation that has experienced a temperature excursion.

FIG. 1 shows an ampule 1 which is partially filled with a solidifiable liquid 2, there being left an air space 3. In this preferred embodiment, the ampule is constructed of a glass, with the fluid and air being permanently sealed within the ampule. Plastic materials which would not become brittle and crack in the range of cryogenic temperatures may also be used. Further, a plug, stopper or other similar closure can be used in conjunction with a resealable ampule or other container. However, when a permanently sealed ampule is used, there is no chance of leakage, and for a reusable device there is not present the possibility of contamination of the contained fluid. In this figure, the ampule is in a first orientation, and the ampule is cooled to a temperature below the freezing point of the liquid 2. FIG. 2 sets forth a second orientation for the ampule, wherein liquid 2 is still in a frozen condition but is now contacting a substantially vertical surface of the ampule. In this condition, the frozen liquid is in a position wherein, if melting occurs, the liquid will orient itself under the gravity to the condition of FIG. 3. If any refreezing occurs, there will still be a true indication of the excursion, since the contained liquid 2 will be refrozen, but with the liquid on the horizontal surface as set out in FIG. 3. In this way, any temperature excursion is permanently recorded.

Figure 4:
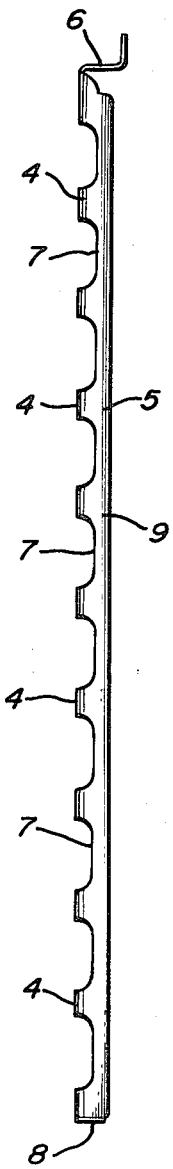
FIG. 4 is a side elevational view of an ampule holding rack.

FIG. 4 sets out a side elevational view of an ampule carrying and storage rack for use in cryogenic chambers. The rack is preferably constructed of a single piece of sheet material 5. This sheet is stamped or otherwise cut to form a plurality of openings 6 therethrough, the openings preferably being disposed along the longitudinal median line of the sheet 5 as shown. The sheet is also cut away at the ends to form tabs 6 and 8. The body of the sheet 5, between the end portions, is bent to form a hollow, resilient, elongated channel-like body. The sheet 5 thus has an open channel side, and two continuous sides, one of which being 9, these being connected by sections 4. Sections 4 also carry projections which extend into the channel-like area and separate the channel into a series of compartments 7. The ampule of FIGS. 1–3, or some similar container, is maintained within a channel compartment by the resilient grip of the continuous side portions.

FIG. 5 shows the rack of FIG. 4 with a plurality of ampules inserted within the resilient holding channel. In this view, the rack holds a series of six ampules. The size of a rack and the number of ampules within a rack is discretionary. Further, in this embodiment, only two of the ampules, 10 and 11, are telltale temperature recording devices, the remaining ampules 12–15 contain animal semen or some other material. In this view, the rack and ampules are in a first orientation, so that when the solidifiable liquid 2 in ampules 10 and 11 is frozen, it will be in contact with a side wall of the ampules. 9 and 17 are the resilient sides, and 16 the projection which divides the elongated channel-like body into compartments. FIG. 6 shows the second orientation of the rack and ampules, the orientation in which the rack is stored and transported. Since the liquids in ampules 10 and 1 was frozen while the rack was substantially horizontal (FIG. 5) and it is now substantially vetical, any melting of frozen liquid 2 will reorient this liquid to the position of FIG. 7. The ampules 10 and 11, in FIG. 7, show that the liquid has melted and become reoriented in contact with the bottom surface of the ampule. Even if refrozen, the liquid will remain in this orientation, since the rack is maintained in the vertical position during storage and transport. In this way, the temperature excursion has been permanently recorded.

These figures set out the preferred structure and method of use of the present invention. However, it is also possible to have the liquid frozen in the ampules and then insert these into the rack. Other variations are also possible. A rack may only contain telltale temperature recording devices, each set for a different temperature between 0° and −150°C. But in any of the variations, the telltale ampules can be reused merely by reorienting and refreezing, providing significant added savings.

The ampules used in the practice of this invention are preferably of the shape depicted in the drawings and are filled to about one-third to about two-thirds of their volume, and preferably to one-half of the volume. When filled to this extent, the liquid tends to fill the head portion and partially fill the body portion of the ampule. By the head portion being filled, when frozen the constriction at the head portion aids in maintaining the frozen liquid in its orientation, and better able to withstand any vibration and jarring during transport. The liquids used are broadly those having a defined freezing point between 0° and −150°C, and having a boiling point above about 50°C. It is desirable that the boiling point be above normally experienced ambient temperatures to preclude any pressure buildup within the ampule leading to possible rupture during handling. Some useful liquids are given in table I.

TABLE I

| Liquid | °C Melting Temperature |
| --- | --- |
| Diethylene glycol | −10.45 |
| Ethylene glycol | −17.4 |
| Carbon tetrachloride | −22.8 |
| 1-heptanol | −41.5 |
| 1-hexanol | −51.6 |
| Chloroform | −63.5 |
| Iso amyl acetate | −78.3 |
| 1-pentanol | −78.5 |
| n-butyl alcohol | −89.2 |
| Propyl butyrate | −95.2 |
| Methanol | −97.8 |
| Cyclohexene | −103.7 |
| Ethanol | −114.6 |
| 1-propanol | −127 |

There are a multitude of other useful liquids. This listing is meant to be exemplary and is not exhaustive of useful liquids.

Further, it is desirable when a series of different liquids having different melting points are used to color each with a dye characteristic of that temperature. By such a coloration in conjunction with ampule temperature labelling, there is decreased the possibility of human error in any readings. Any dye which is soluble in the organic telltale ampule fluid is useful. Essentially this includes most of the organic dyes, both natural and synthetic. Included are those of the azo, anthroquinone and phthalocyanine classes, as well as those known as food dyes. Further to obviate any error, the telltale temperature ampules and the biologic sample ampules are of a different size and shape and have different lettering. The telltale temperature devices contain data on temperatures, while the biologic sample ampules carry other data.

EXAMPLE I

A series of ampules are filled to one half the full volume with the fluids of table I. The ampules are then sealed and set in a first orientation as described in FIG. 1 and frozen. The ampules are then ready to be inserted into the racks and put into the cryogenic refrigerators.

EXAMPLE II

At Madison, Wisconsin, three cryogenic refrigerators (Linde LR-25-6 liquid nitrogen refrigerators) are charged with liquid nitrogen and each filled with 10 racks containing bovine semen samples. Into a first refrigerator is also inserted a rack containing in the upper portion two of the telltale temperature devices of example I. This rack is also in closer proximity to the refrigerator opening than any sample rack. Within this rack the uppermost ampule contains frozen carbon tetrachloride and the lower ampule isoamyl acetate. The second refrigerator contains a telltale temperature rack the same as the first refrigerator, except that a single ampule of frozen isoamyl acetate (example I) is used. In the third refrigerator, each semen sample rack has in its uppermost portion and in closest proximity to the refrigerator opening an ampule of frozen isoamyl acetate (example I). These refrigerators are sealed and ready for shipment. From Madison the refrigerators are shipped by truck to O'Hare Field, Chicago, where they undergo customs clearance and are loaded on an aircraft for shipment to London Airport, Ontario, Canada. From London Airport, the refrigerators are forwarded by truck to Woodstock, Ontario, and the purchaser. Four days have elapsed in shipping. The refrigerators are stored for 2 weeks, opened and the semen samples used. On opening of each refrigerator, the temperature telltale devices indicate no temperature excursions, since the contained fluids are in a first orientation as set out in FIG. 6. If there had been an excursion, the ampules would be as described in FIG. 7.

EXAMPLE III

At Madison, Wisconsin, a cryogenic refrigerator (Linde LR-25B-6) is charged with liquid nitrogen and filled with four racks containing bovine semen samples. In this refrigerator, a rack containing two temperature telltale devices of example I, each filled with frozen isoamyl acetate, are placed at extreme ends of a rack, the rack inserted into the refrigerator, and the refrigerator sealed. The refrigerator is shipped by truck to Orlando, Florida. Shipment takes 5 days. On receipt, the refrigerator is stored for 8 days. The refrigerator is opened for sample removal and it is found that the liquid in the telltale temperature ampules is partly frozen (slushlike) on the bottoms of the ampules, as in FIG. 7. The refrigerator has experienced an excursion. The semen samples are discarded and samples reordered. The cryogenic refrigerator is returned to Madison for testing for defects. A seal is found to be defective and is replaced.

What is claimed is:

1. A reusable temperature recording telltale system useful under cryogenic conditions consisting of a container rack containing a plurality of ampules, some of said ampules being telltale temperature recording devices and some of said ampules containing a product, said rack comprising a hollow elongated channel-like body extending over an arc of slightly greater than 180° in cross section to engage ampules over slightly greater than one-half of their circumference and having an open side delimited by opposed edge portions of said body, said edge portions being spaced apart a distance slightly less than the transverse dimension of the main portion of said ampules, whereby ampules are retained in said rack by said edge portions and may be ejected through said open side by pressure applied through said openings, and said ampules which are telltale temperature recording devices being transparent and having a head portion and a body portion with a constricted center portion connecting said head portion and said body portion and having a solidifiable liquid in a continuous frozen contact with a surface within said head portion of said ampule, whereby when a temperature of greater than the freezing point of said solidifiable liquid is sensed, said solidifiable liquid changes to solely within the body portion of said ampule.

2. A device as in claim 1 wherein said solidifiable liquid has a freezing point of from about 0° to about −150°C.

3. A device as in claim 1 wherein said solidifiable liquid is selected from the group consisting of diethylene glycol, ethylene glycol, carbon tetrachloride, 1-heptanol, 1-hexanol, chloroform, 1-pentanol, n-butyl alcohol, propyl butyrate, methanol, cyclohexene ethanol, isoamyl acetate and 1-propanol.

4. A device as in claim 1 wherein each telltale temperature recording ampule further contains a dye.

* * * * *